United States Patent
Wu

(10) Patent No.: US 10,490,916 B1
(45) Date of Patent: Nov. 26, 2019

(54) LIGHT-EMITTING TERMINAL BLOCK STRUCTURE

(71) Applicants: DINKLE ENTERPRISE CO., LTD., New Taipei (TW); DINKLE ELECTRIC MACHINERY (CHINA) CO., LTD., Kunshan, Jiangsu (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Kunshan, Jiangsu (CN)

( * ) Notice: Subject to any disclaimer, the term of this patent is extended or adjusted under 35 U.S.C. 154(b) by 0 days.

(21) Appl. No.: 16/190,115

(22) Filed: Nov. 13, 2018

(51) Int. Cl.
| | | |
|---|---|---|
| H01R 9/24 | (2006.01) | |
| F21V 8/00 | (2006.01) | |
| H01R 9/26 | (2006.01) | |
| G08B 5/36 | (2006.01) | |
| F21V 19/00 | (2006.01) | |
| F21Y 115/10 | (2016.01) | |

(52) U.S. Cl.
CPC ....... H01R 9/2425 (2013.01); F21V 19/0015 (2013.01); G02B 6/0001 (2013.01); G08B 5/36 (2013.01); H01R 9/2616 (2013.01); F21Y 2115/10 (2016.08)

(58) Field of Classification Search
CPC ...... H01R 9/2425; H01R 9/2616; G08B 5/36; F21V 19/0015; G02B 6/0001; F21Y 2115/10
See application file for complete search history.

(56) References Cited

U.S. PATENT DOCUMENTS

| | | | | |
|---|---|---|---|---|
| 5,885,100 A | * | 3/1999 | Talend | G02B 6/4292 439/490 |
| 6,217,371 B1 | * | 4/2001 | Wu | H01R 13/6641 439/490 |
| 6,222,717 B1 | * | 4/2001 | Waas | H01R 4/2433 361/119 |
| 6,375,514 B1 | * | 4/2002 | Chih | H01R 13/24 439/676 |
| 10,072,803 B1 | * | 9/2018 | Nelson | F21S 4/008 |
| 2001/0000767 A1 | * | 5/2001 | Ezawa | H01R 13/6691 439/490 |
| 2001/0004567 A1 | * | 6/2001 | Chen | H01R 13/514 439/607.01 |
| 2009/0093154 A1 | * | 4/2009 | Shen | H01R 13/7172 439/490 |

\* cited by examiner

*Primary Examiner* — Truc T Nguyen
(74) *Attorney, Agent, or Firm* — Chun-Ming Shih; HDLS IPR Services

(57) ABSTRACT

A light-emitting terminal block structure is provided. A lighting module includes a circuit board and a lighting component. An insulation body is combined on the circuit board and has an accommodating space, an insertion hole and an indication hole. The insulation body is formed with a notch at a side facing the circuit board, and the lighting component is located in the notch. A light pipe is disposed in the accommodating space and has a light-guiding end and a light-emitting end. The light-guiding end is oriented toward the light emitting element and spaced apart from the light emitting element by a distance. The indicator hole is exposed from the light-emitting end, and the conductive seat is combined in the accommodating space and has a resilient plate and a soldering leg soldered on the circuit board.

9 Claims, 6 Drawing Sheets

LIGHT-EMITTING TERMINAL BLOCK STRUCTURE

BACKGROUND OF THE INVENTION

Field of the Invention

The present invention generally relates to terminal blocks and, in particular to light-emitting terminal block structure.

Description of Prior Art

A terminal block is an electrical connecting device composed of an insulating seat and a conductive element which are provided as a working platform for electrically connecting with a plurality of wires. Moreover, terminal blocks are applied over a wide range such as electrical appliances (for example, air conditioners, refrigerators, washing machines, or ovens), mechanical equipment such as industrial computers, uninterruptible power systems, power supplies etc. or engineering control equipment (such as electromechanical systems, refrigerated air conditioners or programmable controllers, etc.) and other devices, or data transmission cable etc.

Furthermore, a part of terminal blocks is provided with light emitting diodes (LEDs) on the circuit board, and light pipes are accompanied to show the working states of the terminal blocks. However, since terminal blocks need to be reflowed with SMT parts on circuit boards, the light emitting diodes and light pipes must meet the requirements of high-temperature resistance for the reflow so that the materials of the light emitting diodes and light pipes are limited. Therefore, the cost of the materials will be increased.

In view of the above drawbacks, the Inventor proposes the present invention based on his expert knowledge and elaborate researches in order to solve the problems of prior art.

SUMMARY OF THE INVENTION

Accordingly, an object of the present invention is to provide a light-emitting terminal block structure so that the light pipe will not be damaged by the high temperature when passing the tin furnace.

In order to achieve the object mentioned above, the present invention provides a light-emitting terminal block structure for inserting a cable. The light-emitting terminal block structure comprises a lighting module, an insulation body, a light pipe and a conductive seat. The lighting module includes a circuit board and a lighting component disposed on the circuit board. The insulation body is combined on the circuit board. The insulation body has an accommodating space, an insertion hole communicated with the accommodating space and an indication hole located at a side of the insertion hole. The insulation body is formed with a notch at a side facing the circuit board, and the lighting component is located in the notch. The light pipe is disposed in the accommodating space and has a light-guiding end and a light-emitting end located oppositely. The light-guiding end is oriented toward the light emitting element and spaced apart from the light emitting element by a distance. The light-emitting end is exposed the indicator hole, and a conductive seat is combined in the accommodating space. The conductive seat has a resilient plate for elastically abutting against the cable and a soldering leg soldered on the circuit board.

Comparing to the prior art, the light-emitting terminal block structure of the present invention is provided for inserting a cable, and the deposition of the light pipe is provided for transmitting the light emitted from the lighting module, thus the working state of the terminal block can be recognized from the indication hole at the top of the insulation body. In addition, the light receiving plane of the light pipe is spaced apart from the light emitting element by a distance so that the light-guiding end will not be deformed or damaged due to the high temperature when passing a tin furnace.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

Figure 1:
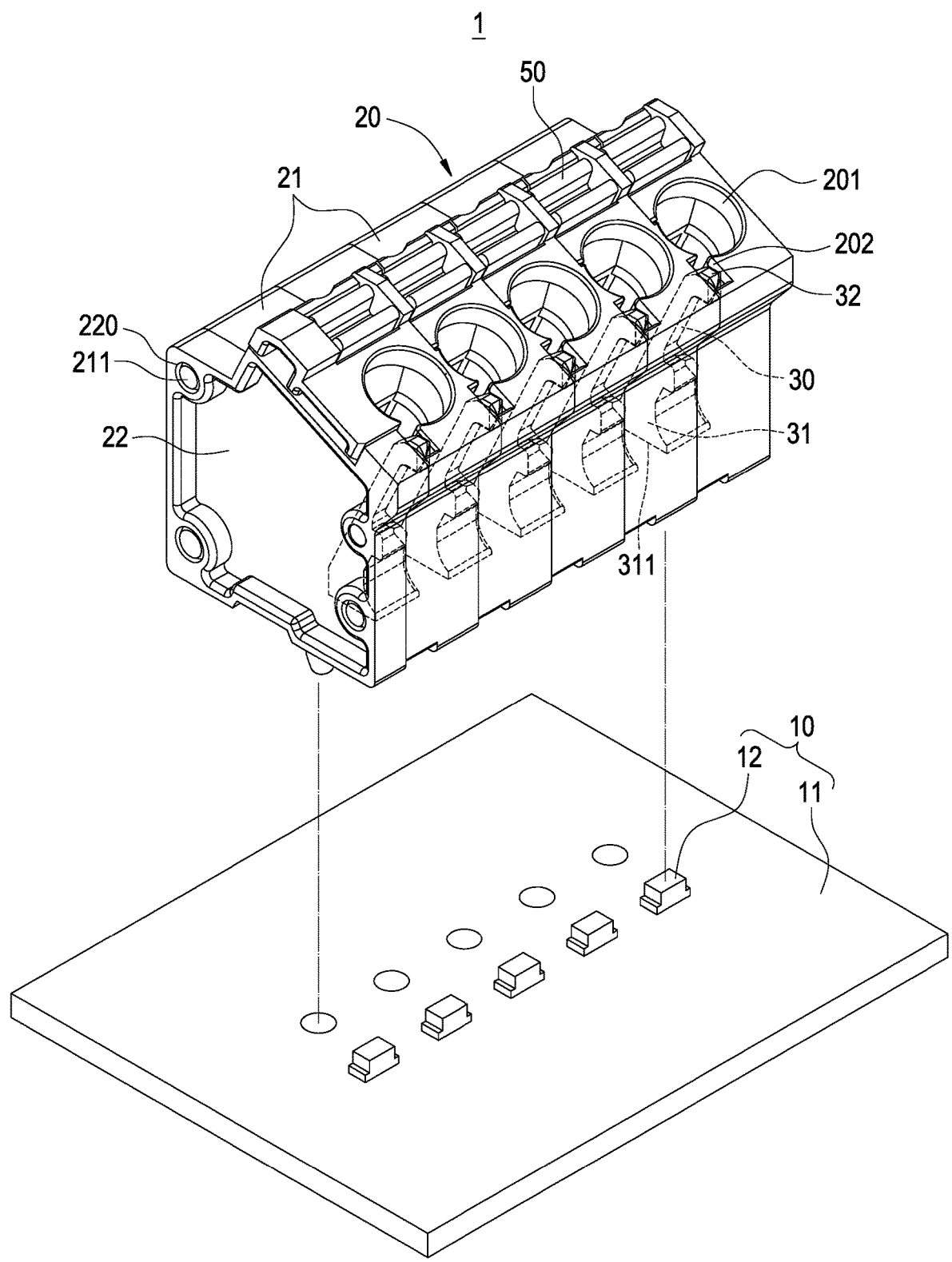
FIG. 1 is a perspective explosion schematic view of the insulation body and the lighting module of the present invention.

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 1 to FIG. 4, which depict an explosion schematic view of the insulation body and the lighting module of the present invention, an explosion schematic view of the insulation body and the light pipe of the present invention, a combination schematic view of the insulation body and the light pipe of the present invention, and a combination schematic view of the insertion seat and the cover of the present invention. The light-emitting terminal block structure 1 of the present invention includes a lighting module 10, an insulation body 20, a light pipe 30 and a conductive seat 40. The insulation body 20 is disposed on the lighting module 10. The light pipe 30 and the conductive seat 40 are disposed in the insulation body 20 so that the light-emitting terminal block structure 1 can depict the working status of the terminal block. More detailed descriptions of the light-emitting terminal block structure 1 are as follows.

As shown in FIG. 1, the lighting module 10 includes a circuit board 11 and a lighting component 12 disposed on the circuit board 11. Preferably, the lighting component 12 is a light emitting diode (LED).

Figure 2:
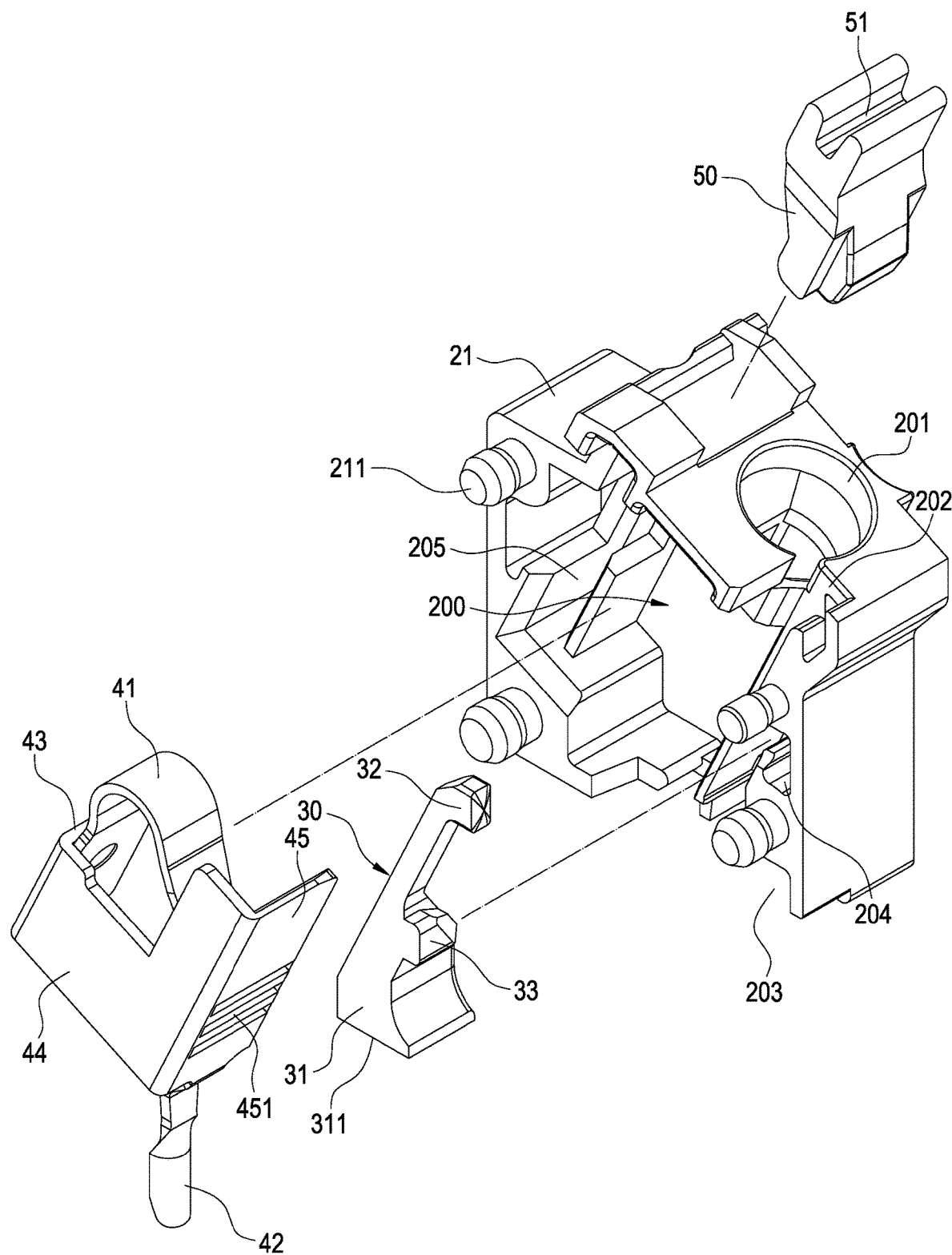
FIG. 2 is a perspective explosion schematic view of the insulation body and the light pipe of the present invention.
Figure 3:
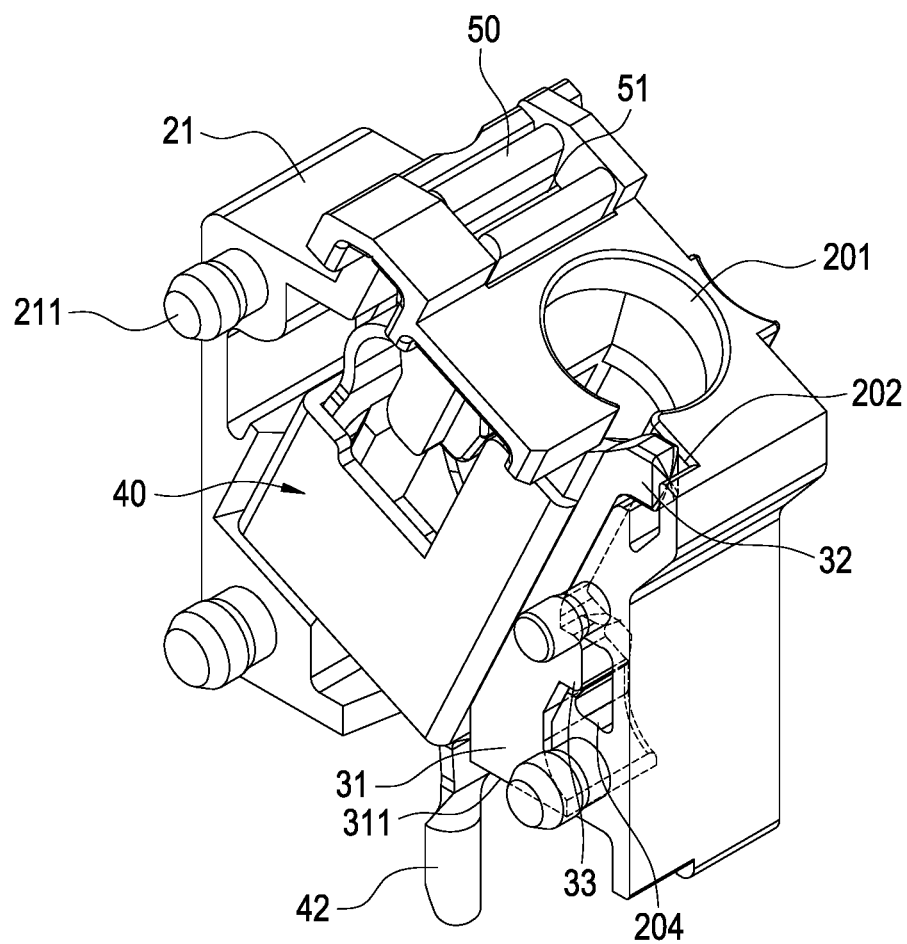
FIG. 3 is a combination schematic view of the insulation body and the light pipe of the present invention.

Please refer to FIG. 2, the insulation body 20 has an accommodating space 200, an insertion hole 201 communicated with the accommodating space 200 and an indication hole 202 located at a side of the insertion hole 201. The insulation body 20 is formed with a notch 203 to communicate with outside at a side of the accommodating space 200, and the notch 203 is provided for accommodating the lighting component 12.

The light pipe 30 is made of translucent plastic material and disposed in the accommodating space 200. The light pipe 30 has a light-guiding end 31 and a light-emitting end 32 located oppositely. The light-guiding end 31 has oriented toward the light emitting element 12 for receiving the light emitted from the light-emitting element 12 and guiding the received light to the light-emitting end 32. In addition, the light-emitting end 32 is exposed the indicator hole 202 for showing the light emitted by the light-emitting element 12. Preferably, the light-guiding end 31 of the light pipe 30 is shaped as a platform and has a light receiving plane 311 on a side facing the lighting component 12, and an area of the light receiving plane 311 is larger than the lighting component 12. Besides, the light-emitting end 32 of the light pipe 30 is shaped as a hook.

In the present embodiment, the insulation body 20 is formed with a trough 204 at a side of the accommodating space 200. Moreover, the light pipe 30 is formed with a hook 33. The disposition of the hook 33 can increase the structural strength of the light pipe 30, and the light pipe 30 is positioned in the insulation body 20 through the hook 33 snapped in the trough 204 (refer to FIG. 3 and FIG. 6).

The conductive seat 40 is combined in the accommodating space 200, and the conductive seat 40 has a resilient plate 41 and a soldering leg 42. Specifically, the conductive seat 40 further includes a positioning plate 43, a supporting plate 44 extended and bended from the positioning plate 43, a stopping plate 45 connected with the supporting plate 44 and located at an opposite side of the positioning plate 43. Besides, the resilient plate 41 is connected with the positioning plate 43, and the soldering leg 42 is connected with the stopping plate 45. In addition, a free end 411 of the resilient plate 41 is located in an insertion space 400 enclosed by the positioning plate 43, the supporting plate 44 and the stopping plate 45.

In more detail, the stopping plate 45 has a plurality of positioning portions 451. When there is no cable inserted in the conductive seat 40, the free end 411 of the resilient plate 41 is abutted at one of the positioning portions 451. On the other hand, when a cable is inserted in the accommodating space 400, the cable will be pushed and positioned by the free end 411 of the resilient plate 41.

In the present embodiment, the insulation body 20 is formed with a groove 205, and the positioning plate 43 of the conductive seat 40 is inserted in the groove 205 for combining in the accommodating space 200.

In an embodiment of the present invention, the light-emitting terminal block structure 1 further includes a lever 50. One end of the lever 50 has a slot 51 exposed the insulation body 20, and the slot 51 is provided for positioning a tool (not shown) to pull the lever 50. Besides, the other end of the lever 50 will press the resilient plate 41 for facilitating an outer cable inserted in the conductive seat 40 when the lever 50 is pulled by the tool.

Figure 4:
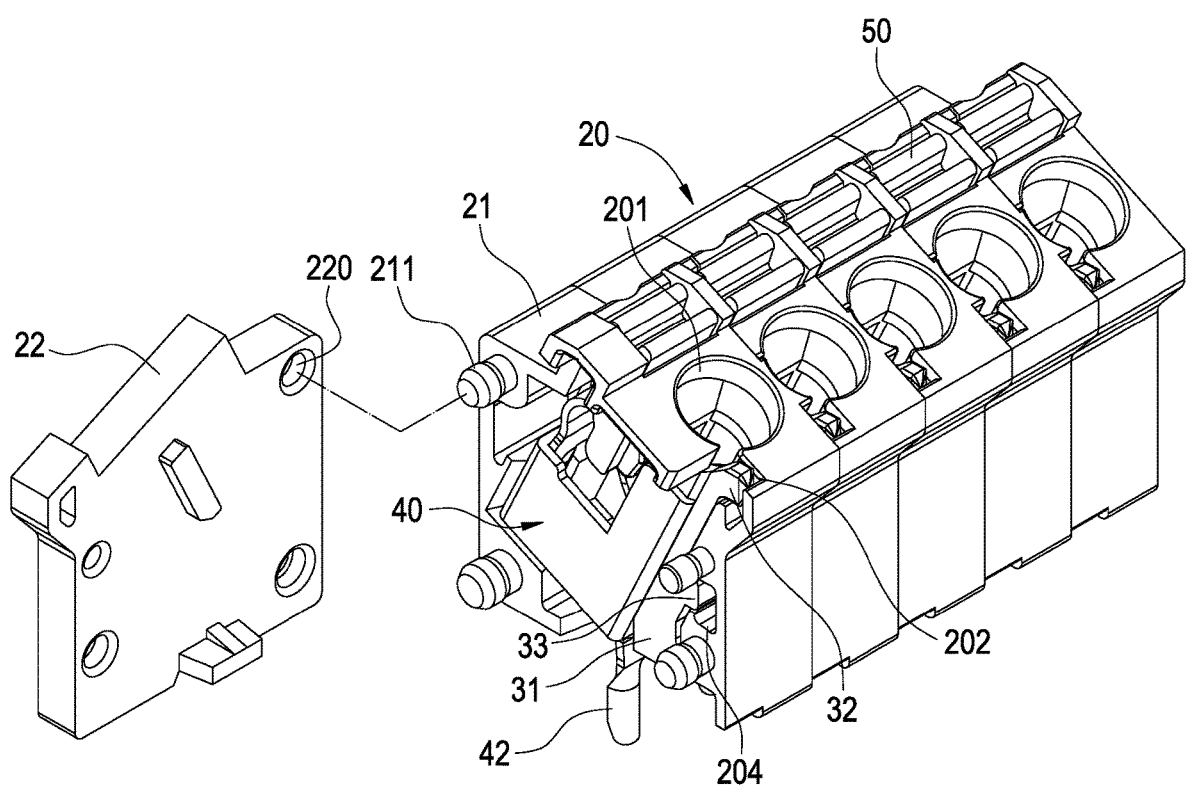
FIG. 4 is a combination schematic view of the insertion seat and the cover of the present invention.

As shown in FIG. 4, the insulation body 20 includes at least one insertion seat 21 and a cover 22 combined at a side of the at least one insertion seat 21. Furthermore, the insertion seat 21 is formed with the accommodating space 200, and the cover 22 covers one side of the accommodating space 200.

It is worthy of notice that, in the present embodiment, the insertion seat 21 is formed with a plurality of pillars 211 in the accommodating space 200, and the cover 22 has a plurality of through holes 220. The insertion seat 21 and the cover 22 are combined together by the pillars 211 inserted in the through holes 220 separately.

In real practice, a quantity of the insertion seat 21 is plural. The insertion seats 21 are arranged parallel with each other, and the cover 22 covers one side of the outermost insertion seat 21 (as shown in FIG. 4).

Figure 5:
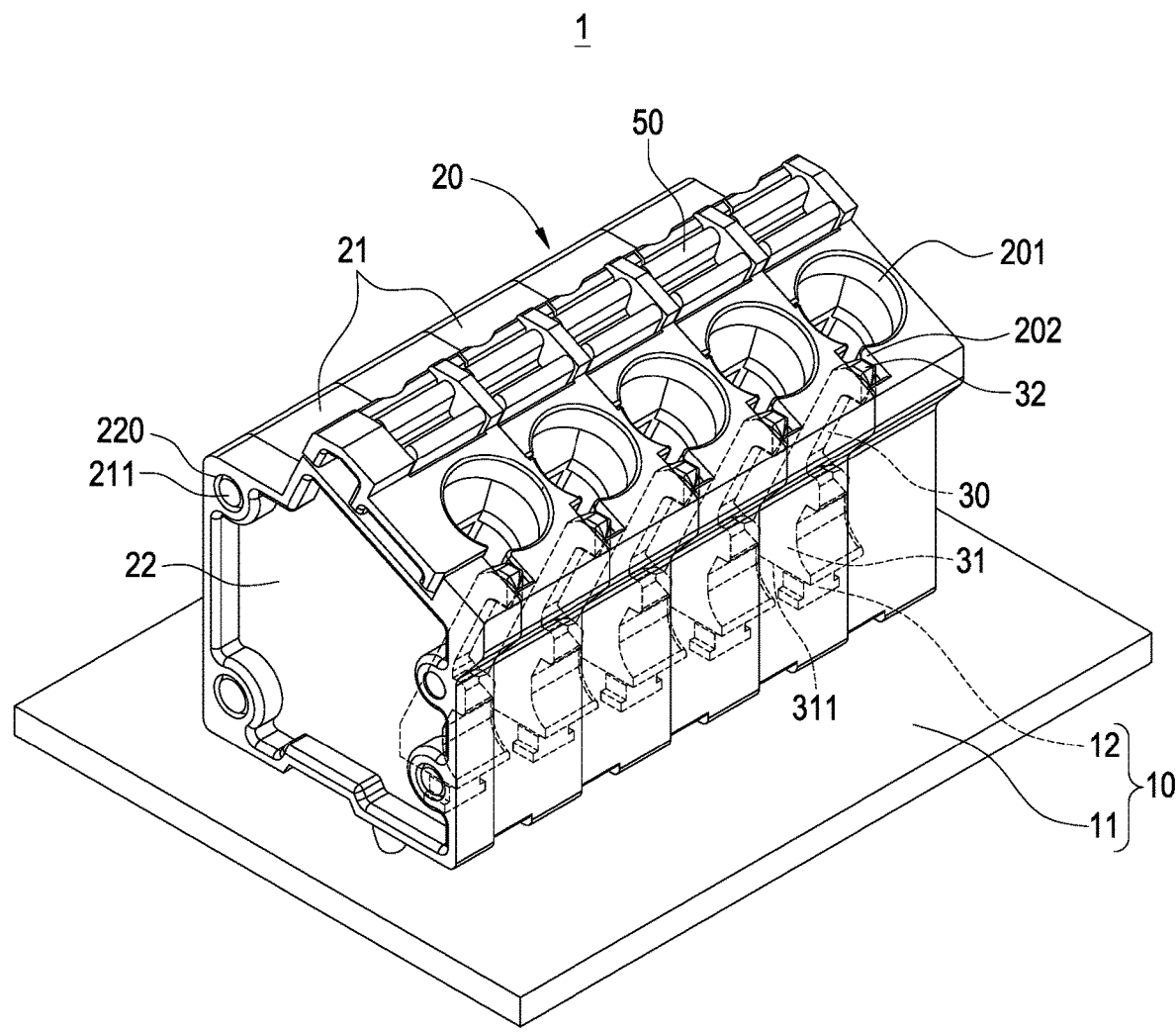
FIG. 5 is a perspective schematic view of the light-emitting terminal block structure of the present invention.
Figure 6:
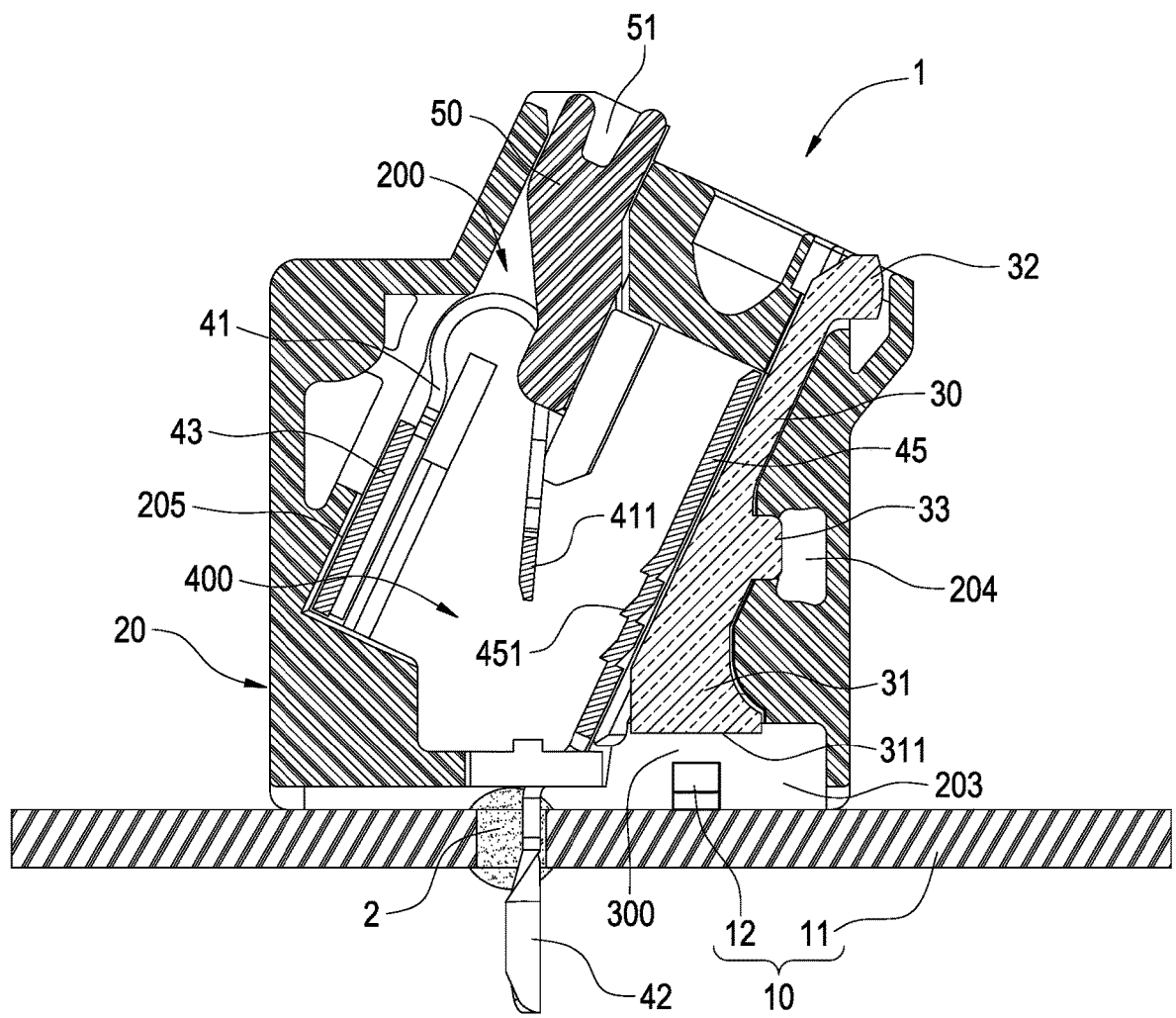
FIG. 6 is a cross sectional schematic view of the light-emitting terminal block structure of the present invention.

Please further refer to FIG. 5 and FIG. 6, they depict a perspective schematic view of the light-emitting terminal block structure of the present invention and a cross sectional view of the light-emitting terminal block structure of the present invention. The light-emitting terminal block structure 1 of the present invention is provided to electrically connect with a cable (not shown) for transmitting signals. In addition, the light-emitting terminal block structure 1 of the present invention can guide the light emitted by the light-emitting module 10 through the light pipe 30. Therefore, the working state of the terminal block can be recognized directly from the indication hole 202 at the top of the insulation body 20.

As shown in FIG. 6, the insulation body 20 is formed with a notch 203 at a side facing the circuit board 11, and the lighting component 12 is located in the notch 203. Besides, the light-guiding end 31 of the light pipe 30 faces the lighting component 12 and has a light receiving plane 311, and an area of the light receiving plane 311 is larger than the lighting component 12 so as to increase light entrance areas for receiving the light emitted by the light emitting element 12 over a wide range.

Moreover, the light-emitting terminal block structure 1 of the present invention has to pass a tin furnace at a high-temperature during a reflow operation so that electronic parts can be soldered on the circuit board 11 through wave soldering. In the present invention, the soldering leg 42 is fixed to the circuit board 11 through the solder 2. It is worthy of notice that, the light receiving plane 311 of the light pipe 30 is spaced apart from the light emitting element 12 by a distance 300. The deposition of the distance 300 is provided so that the light-guiding end 31 will not be deformed or damaged due to high temperature.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A light-emitting terminal block structure for inserting a cable, comprising:

a lighting module including a circuit board and a lighting component disposed on the circuit board;

an insulation body combined on the circuit board, the insulation body having an accommodating space, an insertion hole communicated with the accommodating space and an indication hole located at a side of the insertion hole; the insulation body having a notch formed at a side facing the circuit board, and the lighting component being located in the notch;

a light pipe disposed in the accommodating space, the light pipe having a light-guiding end and a light-emitting end located oppositely; the light-guiding end oriented toward the light emitting element and spaced apart from the light emitting element by a distance, and the light-emitting end exposed the indicator hole;

a conductive seat combined in the accommodating space, the conductive seat having a resilient plate and a soldering leg soldered on the circuit board; and a lever, wherein one end of the lever has a slot exposed the insulation body; the slot is provided for positioning a tool to pull the lever and let another end of the lever press the resilient plate.

2. The light-emitting terminal block structure according to claim 1, wherein the insulation body includes at least one insertion seat and a cover combined at a side of the at least one insertion seat; the insertion seat is formed with the accommodating space, and the cover covers one side of the accommodating space.

3. The light-emitting terminal block structure according to claim 1, wherein the light-guiding end of the light pipe is shaped as a platform and has a light receiving plane at a side facing the lighting component, and an area of the light receiving plane is larger than the lighting component.

4. The light-emitting terminal block structure according to claim 1, wherein the conductive seat further includes a positioning plate, a supporting plate extended and bended from the positioning plate, a stopping plate connected with the supporting plate and located at an opposite side of the positioning plate; the resilient plate is connected with the positioning plate, and the soldering leg is connected with the stopping plate.

5. The light-emitting terminal block structure according to claim 2, wherein the insertion seat is formed with a plurality of pillars at a periphery of the accommodating space, and the cover has a plurality of through holes; the insertion seat and the cover are combined together by the pillars inserted in the through holes separately.

6. The light-emitting terminal block structure according to claim 2, wherein a quantity of the insertion seat is plural, and a quantity of the lighting component is plural and corresponded with the insertion seat; the insertion seats are arranged parallel to each other, and the cover covers one side of the outer insertion seats.

7. The light-emitting terminal block structure according to claim 4, wherein the insulation body is formed with a groove, and the positioning plate is inserted in the groove.

8. A light-emitting terminal block structure for inserting a cable, comprising:

a lighting module including a circuit board and a lighting component disposed on the circuit board;

an insulation body combined on the circuit board, the insulation body having an accommodating space, an insertion hole communicated with the accommodating space and an indication hole located at a side of the insertion hole; the insulation body having a notch formed at a side facing the circuit board, and the lighting component being located in the notch;

a light pipe disposed in the accommodating space, the light pipe having a light-guiding end and a light-emitting end located oppositely; the light-guiding end oriented toward the light emitting element and spaced apart from the light emitting element by a distance, and the light-emitting end exposed the indicator hole; and a conductive seat combined in the accommodating space, the conductive seat having a resilient plate and a soldering leg soldered on the circuit board, wherein the insulation body is formed with a trough at a side of the accommodating space; the light pipe is formed with a hook, and the light pipe is positioned in the insulation body through the hook snapped in the trough.

9. A light-emitting terminal block structure for inserting a cable, comprising:

a lighting module including a circuit board and a lighting component disposed on the circuit board;

an insulation body combined on the circuit board, the insulation body having an accommodating space, an insertion hole communicated with the accommodating space and an indication hole located at a side of the insertion hole; the insulation body having a notch formed at a side facing the circuit board, and the lighting component being located in the notch;

a light pipe disposed in the accommodating space, the light pipe having a light-guiding end and a light-emitting end located oppositely; the light-guiding end oriented toward the light emitting element and spaced apart from the light emitting element by a distance, and the light-emitting end exposed the indicator hole; and a conductive seat combined in the accommodating space, the conductive seat having a resilient plate and a soldering leg soldered on the circuit board, wherein the light-emitting end of the light pipe is shaped as a hook.

* * * * *